(12) United States Patent
Bunker

(10) Patent No.: US 8,958,954 B2
(45) Date of Patent: Feb. 17, 2015

(54) ACTUATION OF AN ACTIVE DEVICE OF A VEHICLE UNDER BRAKING

(75) Inventor: Paul Bunker, Whitley (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 13/434,718

(22) Filed: Mar. 29, 2012

(65) Prior Publication Data

US 2013/0079994 A1 Mar. 28, 2013

(30) Foreign Application Priority Data

Mar. 29, 2011 (GB) .................................. 1105276.8

(51) Int. Cl.
*B60R 21/013* (2006.01)
*B60R 21/01* (2006.01)
*B60R 21/0132* (2006.01)
*B60T 7/12* (2006.01)

(52) U.S. Cl.
CPC ............. *B60R 21/01* (2013.01); *B60R 21/0132* (2013.01); *B60T 7/12* (2013.01); *B60R 2021/01272* (2013.01); *B60R 2021/01311* (2013.01); *B60T 2201/03* (2013.01); *B60W 2510/182* (2013.01)
USPC ............................................ 701/45; 701/49

(58) Field of Classification Search
CPC ................. B60R 21/0132; B60R 2021/01311; B60R 22/195; B60R 22/34; B60R 22/46; B60R 21/01; B60W 2510/182

USPC ............... 701/45, 94, 70, 46, 47, 49; 188/2 R
See application file for complete search history.

(56) References Cited

U.S. PATENT DOCUMENTS

| | | | |
|---|---|---|---|
| 6,276,766 B1 * | 8/2001 | Yamada ......................... | 303/154 |
| 6,394,495 B1 * | 5/2002 | Specht ........................... | 280/806 |
| 6,409,270 B1 * | 6/2002 | Meder ............................ | 297/464 |
| 6,519,519 B1 | 2/2003 | Stopczynski | |
| 7,040,719 B2 * | 5/2006 | Collins et al. ............... | 303/114.3 |
| 7,167,784 B2 * | 1/2007 | Koerner et al. .............. | 701/33.9 |
| 7,250,850 B2 * | 7/2007 | Mizutani ...................... | 340/435 |
| 7,484,585 B2 * | 2/2009 | Takemura ..................... | 180/268 |
| 8,371,661 B2 * | 2/2013 | Leiber et al. ................ | 303/113.4 |
| 2004/0089758 A1 * | 5/2004 | Bullinger et al. ............ | 242/374 |
| 2006/0237960 A1 * | 10/2006 | Kudo et al. ................... | 280/806 |
| 2008/0221758 A1 | 9/2008 | Bernzen et al. | |
| 2008/0270000 A1 | 10/2008 | Bernzen | |

FOREIGN PATENT DOCUMENTS

DE 102007017669 10/2008
EP 0259694 8/1987

OTHER PUBLICATIONS

UK Search Report for GB1105276.8, dated Jul. 27, 2011, 1 page.

* cited by examiner

*Primary Examiner* — Helal A Algahaim
*Assistant Examiner* — Genna Mott
(74) *Attorney, Agent, or Firm* — Reising Ethington P.C.

(57) ABSTRACT

Early actuation of an active device of a vehicle (e.g., a seat belt tensioner) is provided by applying rate of change of brake pressure to monitored brake pressure, so as to produce a modified brake pressure characteristic which is advanced in time. The active device is actuated at a brake pressure threshold.

13 Claims, 3 Drawing Sheets

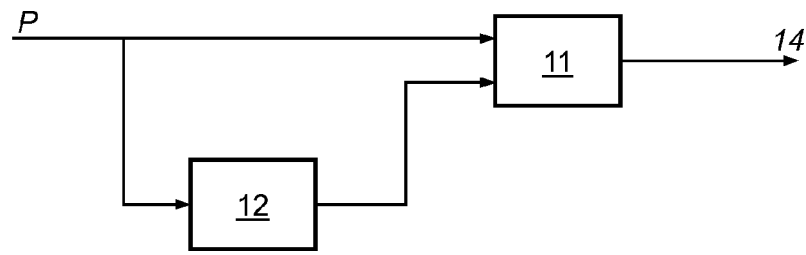
_Fig 1_
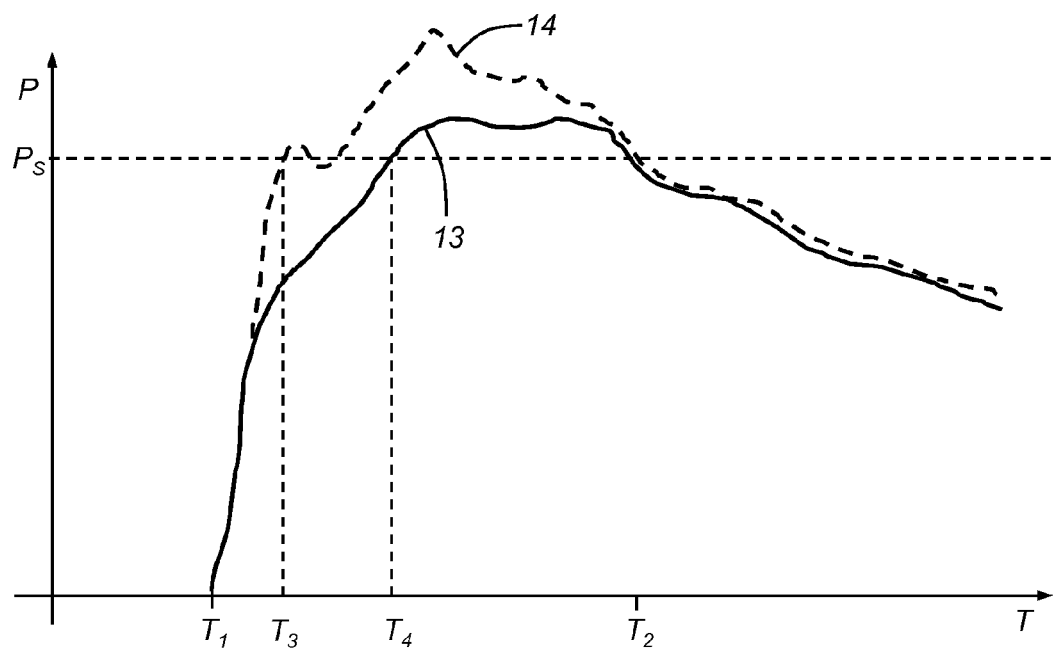
_Fig 2_

ACTUATION OF AN ACTIVE DEVICE OF A VEHICLE UNDER BRAKING

FIELD OF THE INVENTION

This invention relates to actuation of an active device of a vehicle, for example a resettable active device such as an active occupant restraint and/or an active aerodynamic device. Aspects of the invention relate to a method, to a system and to a vehicle.

BACKGROUND

It is known that during a heavy braking maneuver while driving a vehicle, the vehicle occupants may move forward in their seats relative to the vehicle, due to their momentum, before they are restrained by their seat belts. In such events, occupant movement relative to the vehicle is arrested only after the upper body of the occupant has moved away from the backrest of the vehicle seat.

In some events, where the vehicle is decelerating quickly, the movement of the upper body against a locked seat belt may generate a load of 400 N or more in the restraint device. This may be uncomfortable for the vehicle occupants, and to mitigate these loads, active seat belt tensioners have been developed. Active seat belt tensioners use an actuator such as an electric motor to apply a tensioning force to a spool around which the seat belt webbing is wound.

With a conventional inertia seat belt, the spool is arranged to freely pay out seat belt webbing until vehicle acceleration in the longitudinal direction exceeds a pre-determined threshold, at which point a spool lock is activated, preventing further pay out of webbing from the spool. In the event the vehicle driver starts to brake heavily, there is a delay between the application of the vehicle brakes and the locking of the seat belt spool. In this case, the occupants will be moving forward away from their seat backs, until the pay out of webbing is arrested and the occupant is restrained by the locked seat belt. At the point where the moving occupant is restrained by the locked belt, the occupant will feel a sudden increase in the force applied by the webbing restraining them, which may be perceived as uncomfortable.

In contrast, in the event the vehicle is fitted with active seat belt tensioners, the tensioner motor applies a light tensioning force to the webbing spool as vehicle deceleration is detected exceeding a pre-determined threshold, greatly reducing the pay out of webbing and even retracting belt slack, before the occupant is restrained by the seat belt. Such devices are intended only to reduce slack in the seat belt system and mitigate the restraint forces felt by the occupants from the seat belts during normal driving maneuvers such as braking.

Typical active seat belt tensioner devices have a retraction force of around 200 N; this is sufficient to reel-in the majority of any slack in the seat belt webbing before the occupant is restrained thereby. It will be appreciated by one skilled in the art that restraint performance and comfort of the occupant can be greatly improved if the seat belt webbing is tensioned appropriately prior to the seat belt restraining the occupant during vehicle deceleration.

While these active seat belt tensioner devices are generally successful in mitigating the restraint forces felt by the occupants during heavy braking, when compared to standard inertia seat belt devices, synchronisation of their activation with the behaviour of the vehicle is critical if their activation is to be almost imperceptible and not become a distraction to the occupant. Due to their momentum, however, occupants typically move forward slightly in their seats before vehicle deceleration exceeds the triggering threshold. Owing to this relative movement between the occupant and the vehicle, known active seat belt tensioner devices, which are triggered by measured vehicle deceleration, must apply a tensioning force quickly to the seat belt. This sudden application of force to the seat belt is perceivable to the occupants in some normal driving conditions and may be undesirable.

What is required is a method and means of triggering an active seat belt tensioner in advance of the occupant moving away from their seat back.

Ideally, an active seat belt tensioner device would enhance restraint comfort by activating according to driver demand rather the response by the vehicle to said demand. An ideal seat belt tensioner device would remove all slack in the seat belt system in a manner imperceptible to the user, coupling them to the vehicle as early as possible during braking and minimising peak restraint force.

Preferably an active occupant restraint is adapted to be tuned to permit a vehicle occupant to be aware of the operation of the active device(s) without such operation being a distraction—for example by application of pre-determined maximum seat belt tension at maximum retraction speed under all triggered conditions. Alternatively operation of the active device(s) may be substantially imperceptible to the occupants.

A trigger for an active device could be based on rising fluid pressure in the vehicle braking system exceeding a pre-determined pressure threshold, but is necessarily delayed by the initial take-up of slack in the brake pedal actuation linkage and by the initial forward movement of the usual master cylinder piston over a recuperation port. Such delay may provide sufficient time for the upper body of an occupant to leave the vehicle seat back before the seat belt can be tensioned.

On the other hand, a trigger could be based on brake pedal movement in order to improve synchronization of the active device with occupant behaviour. However this may be irritating to the driver, since the control system of a corresponding seat belt actuator may be unable to distinguish between a light touch to modulate vehicle speed and a firm brake pedal application for an emergency stop.

Accordingly the means of actuating the active device should not be susceptible to false inputs.

It is an aim of the present invention to address one or more of these issues. Other aims and advantages of the invention will become apparent from the following description, claims and drawings.

SUMMARY OF THE INVENTION

According to one aspect of the present invention for which protection is sought there is provided a method of providing an actuation signal for an active device of a vehicle, the method comprising the steps of monitoring a change in the fluid pressure in a vehicle braking system, calculating the rate of change of said fluid pressure and applying said rate of change to the monitored fluid pressure in order to generate a boosted fluid pressure characteristic which is ahead of the change in fluid pressure in time.

The rate of change of fluid pressure is an indication of the category of a braking event, and can be used to advance the fluid pressure characteristic in time in a manner appropriate to compensate for the real-time delay in the vehicle responding to driver demand.

Providing an early indication of the category of a braking event facilitates activation of an active device with sufficient time for it to deploy. This method is suitable for a vehicle based system of active devices, triggered by driver demand, improving the operational behaviour of the active device for both the vehicle and the vehicle occupants. By "category" is meant a measure of the effect of increasing deceleration during a braking event on the vehicle and occupants. Thus a light brake actuation by the driver during low speed driving will result in a small increase in brake fluid pressure and will be classified as a lower category of braking event. On the other hand, a heavy actuation of the brakes by the driver, for example when performing an emergency stop manoeuvre when travelling at typical motorway speeds, will result in a high category braking event.

The particular method and means of advancing the signal may be selected by the skilled man using his knowledge and judgement and may, for example, be based on a suitable algorithm or by reference to a look-up table providing a temporal advance dependent upon the rate of change of brake pressure.

Advantageously, the present invention does not rely on monitoring the measured brake pressure alone which, although an improvement over a vehicle deceleration based system, would still suffer delayed response of the active device to driver demand. By applying a gain based on rate of change of brake pressure, the trigger point for the device is advanced in time, without leading to undesirable 'false' triggers. Early trigger of a tensioner device for example leads to a reduction in belt slack and consequently reduced peak restraint force, greatly improving comfort for the occupant during normal driving.

Typically the fluid pressure characteristic is advanced to a greater degree for brake applications in which the rate of change is high. The advance may be linear and progressive, or comprise successive step changes.

The fluid pressure in the braking system is preferably represented by an electronic signal.

The method may include the further steps of applying a threshold to the boosted fluid pressure characteristic, and triggering an active device of a vehicle in response to said threshold being exceeded. More than one threshold may be applied to trigger one of several states of the active device. These states may for example be represented by one or more of different deployment angles of an aerodynamic device, different bolster pressures of an active seat bolster, different positions of an active seat bolster, different speeds of tensioning of a seat belt, and different tensioning loads of a vehicle seat belt.

The method may be inhibited for reducing brake pressure, since this indicates that a braking event has ceased, or is ceasing. However the method of the invention may also be used to control deactivation of an active seat belt tensioner, an active seat bolster, an active aerodynamic aid or other active device of the vehicle.

The method may be inhibited if the rate of change of brake pressure and/or absolute brake pressure do not exceed a pre-determined minimum. Thus a slight or momentary application of the vehicle brakes will not necessarily trigger an active device of the vehicle notwithstanding that the rate of change of brake pressure may be high.

An active device of the vehicle is any device which is capable of actuation or deployment in order to enhance occupant comfort and safety, or any device arranged to enhance vehicle safety, performance, and/or stability during a braking event. Such a device may be an occupant restraint, such as an active seat belt tensioner or an active seat bolster actuator adapted to enhance support of the occupant while seated in the vehicle. The device may be an aerodynamic device such as an air dam or air spoiler which is deployable in order to enhance vehicle stability, performance and/or braking—in particular to generate additional down force so as to improve adhesion between the vehicle tyres and the ground.

Active vehicle devices are typically re-settable, thus permitting repeated activation and de-activation according to demand.

Typically the active device is actuated by a motor, which may be electric, hydraulic, or pneumatic, and responsive to an appropriate vehicle electronic control unit (ECU).

The invention also comprises means of implementing the method of the invention, typically via an electronic control unit (ECU) of a vehicle. Vehicle brake pressure is typically available as an electronic signal from a vehicle CAN-bus or equivalent system, and rate of change of brake pressure can be determined by application of a clock signal of the vehicle electronic control system.

In one embodiment, the method includes the step of conditioning the boosted fluid pressure characteristic by reference to vehicle speed, so that the temporal advance is typically greater as vehicle speed increases.

In another embodiment, the method includes the additional steps of measuring vehicle speed, applying to the fluid pressure characteristic a gain dependent upon vehicle speed, thereby giving a modified brake pressure signal and determining a conditioned boosted fluid pressure characteristic dependent upon said modified brake pressure signal and said boosted fluid pressure characteristic.

Such an arrangement permits further conditioning of the fluid pressure characteristic to more closely approach a desirable control characteristic of the vehicle. In such a method the or each threshold is applied to the conditioned boosted fluid pressure characteristic.

The invention may be confined to actuation of active devices at a single threshold for each braking event, so as to avoid distraction of the driver by repeated changes in the state of the active device for example tensioning, slackening and re-tensioning of a seat belt.

Within the scope of this application the various aspects, embodiments, examples, features and alternatives set out in the preceding paragraphs, in the claims and/or in the following description and drawings may be taken independently or in any combination thereof.

BRIEF DESCRIPTION OF THE DRAWINGS

The present invention will now be described, by way of example only, with reference to the accompanying drawings in which:

FIG. 1 illustrates, in block diagram form, a first embodiment of the invention;

FIG. 2 illustrates graphically the effect of the first embodiment;

DETAILED DESCRIPTION OF THE ILLUSTRATED EMBODIMENTS

Figure 3:
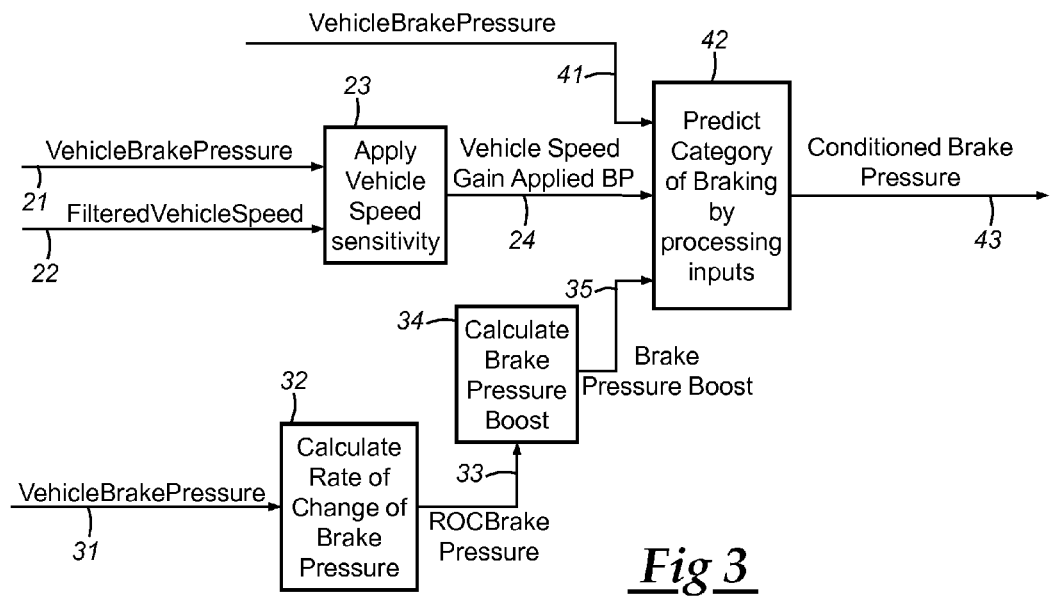
FIG. 3 illustrates in block diagram form, a second embodiment of the invention.

In one form the invention relies upon a modification of the rising pressure characteristic of a conventional hydraulic vehicle braking system, in order to advance that characteristic in time so as to take account of the delay between first movement of the brake pedal and a corresponding deceleration of the vehicle.

In this way momentary movements of the brake pedal, for example during speed modulation of the vehicle, do not provide an indication of a category of a braking event which could be used to actuate an active device of the vehicle. On the other hand a braking event which exceeds a pressure threshold can provide an indication of an appropriate category of a braking event, and the invention allows such indication to be advanced in time by an amount sufficient to allow effective and timely actuation of an active vehicle device, such as a seat belt tensioner.

FIG. 1 illustrates in block diagram form a first embodiment of the invention in which an electrical signal P representative of or corresponding to fluid pressure in the braking system is input to a first calculating module (11). The signal P may be generated by a suitable sensor in the hydraulic brake line. This same signal P is input to a second calculating module (12), in which the rate of change of brake pressure is calculated and output to the first calculating module (11).

The first calculating module applies the rate of change output to advance the rising brake pressure characteristic, in order to produce an output signal (14) which advances this characteristic in time.

FIG. 2 illustrates graphically the effect of the invention by plotting braking system pressure P against time T; a threshold brake pressure $P_s$ is indicative of a high category braking event. The time interval $T_1$–$T_2$ is about one second in this embodiment.

The solid line characteristic (13) indicates rising brake pressure during a braking event, as output from an electrical pressure transducer in the braking system, whereas the dotted line represents the output signal (14) from the calculation module (11). It can be readily observed that the modified brake pressure output signal (14) reaches the threshold $P_s$ at $T_3$, whereas the unmodified brake pressure signal (13) reaches the threshold at $T_4$. In the example illustrated $T_4$–$T_3$ is approximately 300 ms, and $P_s$ is about 60 bar.

Upon reaching the trigger threshold at $T_3$, an active device can be actuated earlier than would be the case for merely monitoring rising brake pressure. An advance in the region of 300 ms may be sufficient to tension a seat belt before an occupant starts to move away from the seat backrest, and can contribute substantially to enhanced comfort of the vehicle occupants during actuation of, for example, an active seat belt tensioner.

For example a look-up table may give the amount of advance at different thresholds of rate of change of brake pressure. The advance may comprise a numerical amount, or a percentage by which measured brake pressure should be increased. Many other possibilities, for example relying upon an algorithm, will be apparent to the skilled man.

FIG. 3 illustrates a modified version of the embodiment of FIG. 1.

A signal (21) indicative of brake pressure is modified according to a filtered vehicle speed signal (22) in a calculation module (23). The output (24) is a modified brake pressure signal related to vehicle speed so as to progressively advance the rising brake pressure signal with increasing vehicle speed. Alternatively the signal may be advanced stepwise or according to any other desirable characteristic.

A second signal (31) indicative of brake pressure passes through a calculation module (32) to give an output (33) of rate of change of brake pressure, as described in the first embodiment. The rate of change of brake pressure determines the calculation of brake pressure 'boost' in a calculation module (34), up to a maximum boost threshold. The output (35) of module (34) is combined with the output (24) and a vehicle brake pressure signal (41) in a calculation module (42) to produce an output (43) which is conditioned by the category of braking event and vehicle speed, and allows triggering of an active device of the vehicle.

It is envisaged that progressive triggering of an active device may be inhibited during a single braking event. Thus the active device may be triggered once only per braking event, in a state appropriate to the category of braking. A braking event may be defined between successive detections of minimum pressure within the braking system.

The vehicle speed has an upper limit above which no further advancing of the brake pressure signal will take place. This greatly enhances comfort by capping excessive actuation cycles during normal highway driving, limiting the maximum trigger or activation sensitivity applied to the active device in contact with the occupant. Conversely, it may be appropriate, depending on the vehicle to which the present invention is applied, to have a different upper speed limit to be used to apply gain to the activation signal for an active aerodynamic device. Increasing this limit, or indeed operating with no upper limit at all, may be useful where the speeds may be sufficient to apply significant aerodynamic forces to the device, requiring greater effort to deploy from a stowed position.

It will be appreciated that such active aerodynamic devices tend to provide increased performance benefit to the vehicle as speed increases. The present invention seeks to provide a tunable control means which may be used to realise the true performance potential available from an active aerodynamic device.

Figure 4:
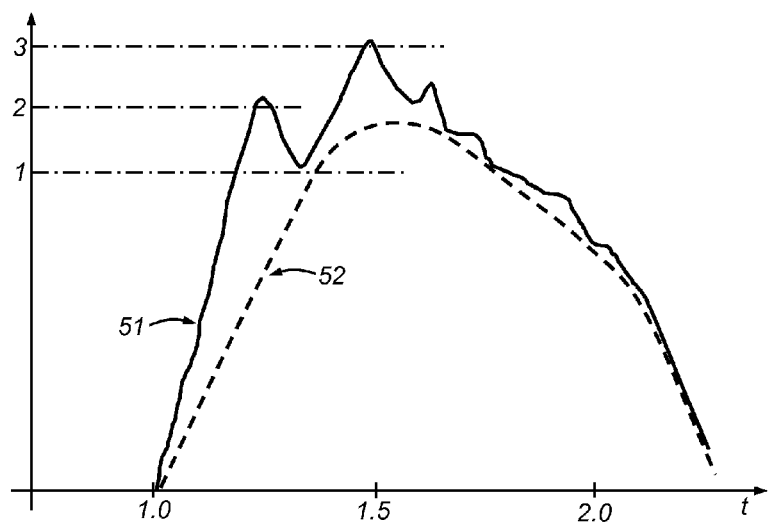
FIG. 4 illustrates graphically the second embodiment of the invention.

FIG. 4 illustrates a predictive braking characteristic (51) compared with a real time measurement of brake pressure (52). Intensity thresholds 1-3 may apply to determine, for example, the load to be applied by a tensioning motor of a seat belt. A single threshold may be applied to each braking event dependent upon the maximum threshold reached within a short reaction period of, for example 150-200 ms. This arrangement mitigates the effect of movement of an occupant against a static seat belt and avoids a further increase in tension as each threshold is crossed.

Figure 5:
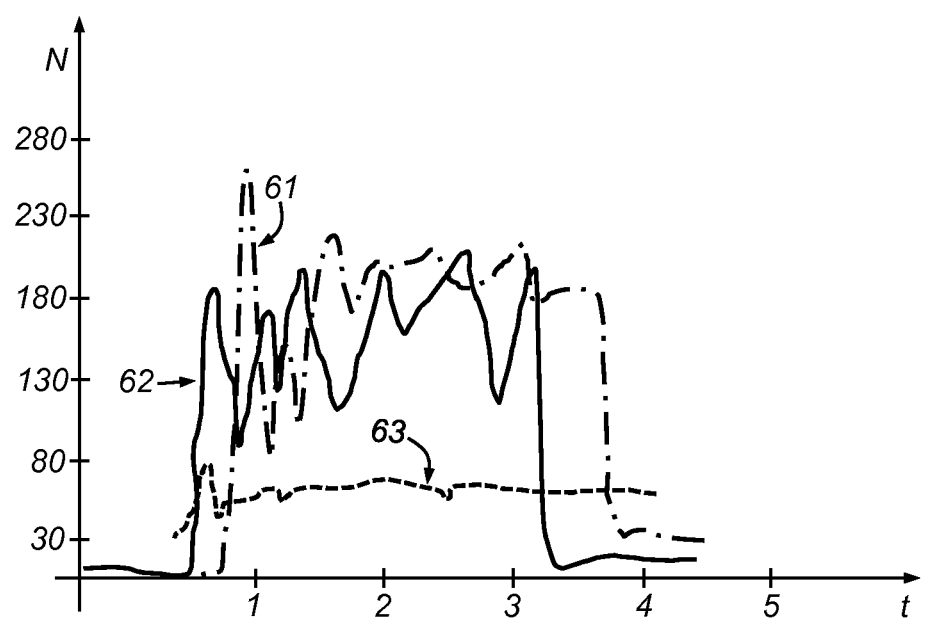
FIG. 5 illustrates comparative seat belt tension with and without the invention.

FIG. 5 illustrates comparative tension of a seat belt under braking with and without an active device trigger, of the kind described above.

Non-active tensioning is illustrated by chain-dot line (61). In this example, tensioning commences at about 0.7 seconds and reaches a peak tension of about 250 N at 0.95 seconds. In this case the occupant may move away from the vehicle seat, to be arrested by a seat belt. Tension then drops to a minimum of about 70 N after a further 150 ms and the characteristic oscillates toward a final mean of around 200 N.

In comparison, active tensioning in accordance with the invention is illustrated by solid line (62), commences at about 0.6 seconds, and reaches a peak of 180 N at about 0.65 seconds. Tension then drops to about 86 N at 0.9 seconds after which the characteristic oscillates towards the mean of 160 N.

The dotted line (63) represents an algorithm trigger characteristic corresponding to a rapid braking event.

It will be appreciated that the invention gives smooth early application of the active device, with lower peak loads.

The present invention provides the occupant with timely coupling with the restraint system, thus reducing peak restraint force, and consequently reducing the perception of belt slack and active belt tensioning. As a result occupant comfort and perception of quality can be substantially enhanced.

Other advantages will be apparent to one skilled in the art and the present examples and embodiments are to be considered illustrative and not restrictive. The invention is not to be limited to the details given herein, but may be modified within the scope and equivalence of the appended claims.

The invention claimed is:

1. A method of providing an actuation signal for an active device of a vehicle, the method comprising:
    monitoring a change in the hydraulic fluid pressure in a hydraulic braking system of the vehicle;
    calculating the rate of change of said hydraulic fluid pressure;
    generating a boosted fluid pressure characteristic which is ahead of the change in hydraulic fluid pressure in time in dependence on the calculated rate of change; and
    providing the actuation signal to control the actuation of the active device of the vehicle in dependence on the boosted fluid characteristic.

2. The method of claim 1, wherein said boosted fluid pressure characteristic is generated from a look-up table by reference to said rate of change of fluid pressure.

3. The method of claim 1, wherein said boosted fluid pressure characteristic is generated from an algorithm incorporating said rate of change of fluid pressure.

4. The method of claim 1, further comprising the step of inhibiting the method when the fluid pressure in the braking system is below a pre-determined fluid pressure.

5. The method of claim 1, further comprising the step of inhibiting the method when the rate of change of fluid pressure in the braking system is below a pre-determined rate of change of fluid pressure.

6. The method of claim 1, further comprising the step of inhibiting the method when the fluid pressure in the braking system is decreasing.

7. The method of claim 1, and including the further step of conditioning said boosted fluid pressure characteristic by reference to vehicle speed.

8. The method of claim 1, including the steps of:
    applying a threshold to said boosted fluid pressure characteristic, and
    triggering the active device of the vehicle in response to said threshold being exceeded.

9. The method of claim 8, wherein several successive thresholds are provided, each threshold indicating a successive condition of the active device of the vehicle.

10. The method of claim 1, wherein the method is carried out using an electronic control system of the vehicle.

11. The method of claim 1, wherein the active device is one or more of:
    a seat belt tensioner,
    an active seat bolster, and
    a deployable aerodynamic device of the vehicle.

12. A system for controlling an actuation of an active device of a vehicle, the system comprising:
    an electronic control unit configured to:
        monitor a change in the hydraulic fluid pressure in a hydraulic braking system of the vehicle;
        calculate the rate of change of said hydraulic fluid pressure;
        generate a boosted fluid pressure characteristic which is ahead of the change in hydraulic fluid pressure in time in dependence on the calculated rate of change; and
        provide an actuation signal to control the actuation of the active device in dependence on the boosted fluid characteristic.

13. A vehicle having a system for controlling an actuation of an active device, wherein the system comprises an electronic control unit configured to:
    monitor a change in the hydraulic fluid pressure in a hydraulic braking system;
    calculate the rate of change of said hydraulic fluid pressure;
    generate a boosted fluid pressure characteristic which is ahead of the change in hydraulic fluid pressure in time in dependence on the calculated rate of change; and
    provide an actuation signal to control the actuation of the active device in dependence on the boosted fluid characteristic.

* * * * *